(12) United States Patent
Kimoto et al.

(10) Patent No.: US 8,075,048 B2
(45) Date of Patent: Dec. 13, 2011

(54) BONNET FOR AUTOMOBILE HAVING AUTOMOBILES THAT PROTECTS THE HEADS OF PEDESTRIANS

(75) Inventors: Yukitane Kimoto, Matsuyama (JP); Hiroshi Kiyama, Iyo-gun (JP)

(73) Assignee: Toray Industries, Inc. (JP)

( * ) Notice: Subject to any disclaimer, the term of this patent is extended or adjusted under 35 U.S.C. 154(b) by 725 days.

(21) Appl. No.: 11/661,443

(22) PCT Filed: Aug. 29, 2005

(86) PCT No.: PCT/JP2005/015646
§ 371 (c)(1),
(2), (4) Date: Feb. 28, 2007

(87) PCT Pub. No.: WO2006/025315
PCT Pub. Date: Mar. 9, 2006

(65) Prior Publication Data
US 2008/0066983 A1    Mar. 20, 2008

(30) Foreign Application Priority Data

Aug. 31, 2004 (JP) .................................. 2004-252335

(51) Int. Cl.
*B62D 25/10* (2006.01)
(52) U.S. Cl. .................. 296/193.11; 180/69.2; 180/274; 296/187.04
(58) Field of Classification Search ............. 296/187.02, 296/187.03, 187.04, 187.09, 193.11, 76; 180/69.2, 69.21, 274
See application file for complete search history.

(56) References Cited

U.S. PATENT DOCUMENTS

| | | | | |
|---|---|---|---|---|
| 2,709,108 A * | 5/1955 | Eggert, Jr. | ........................ | 296/76 |
| 3,709,316 A * | 1/1973 | Glance | ........................ | 180/69.21 |
| 4,359,120 A * | 11/1982 | Schmidt et al. | .......... | 296/187.04 |
| 5,000,997 A * | 3/1991 | Ritchie et al. | .................. | 428/78 |
| 5,124,191 A * | 6/1992 | Seksaria | ........................ | 428/178 |
| 5,605,371 A * | 2/1997 | Borchelt et al. | .......... | 296/187.09 |
| 5,682,667 A * | 11/1997 | Flagg | .............................. | 29/460 |
| 5,988,305 A * | 11/1999 | Sakai et al. | ............... | 296/187.04 |
| 6,237,992 B1 * | 5/2001 | Howard | .................... | 296/187.04 |
| 6,398,286 B1 * | 6/2002 | Devin et al. | ...................... | 296/76 |
| 6,543,086 B2 * | 4/2003 | Bjureblad et al. | .............. | 16/222 |
| 7,052,079 B2 * | 5/2006 | Endo et al. | ............... | 296/193.11 |
| 7,055,894 B2 * | 6/2006 | Ikeda et al. | ............... | 296/187.09 |
| 7,481,488 B2 * | 1/2009 | Ikeda et al. | ............... | 296/193.11 |
| 7,488,031 B2 * | 2/2009 | Ishitobi | .................. | 296/193.11 |
| 7,497,507 B2 * | 3/2009 | Matsushima et al. | .... | 296/193.11 |
| 7,810,877 B2 * | 10/2010 | Ishitobi | .................... | 296/193.11 |
| 2001/0002761 A1 * | 6/2001 | Tsuruta et al. | ................ | 296/189 |

(Continued)

FOREIGN PATENT DOCUMENTS

| | | |
|---|---|---|
| JP | 63-70478 | 5/1988 |
| JP | 11-208511 | 8/1999 |
| JP | 2001-301658 | 10/2001 |
| JP | 2002-284038 | 10/2002 |
| JP | 2003-146252 | 5/2003 |

*Primary Examiner* — Glenn Dayoan
*Assistant Examiner* — Paul Chenevert
(74) *Attorney, Agent, or Firm* — DLA Piper LLP (US)

(57) ABSTRACT

A bonnet for an automobile, the bonnet having an outer member made from fiber reinforced plastic (FRP) and an inner member made from FRP, joined to the back-surface side of the outer, wherein the inner is separated into two parts in the forward and backward direction of a vehicle body. The bonnet can satisfy impact absorbing performance and predetermined required performance for deformation in a collision accident etc., and can improve easiness of production.

39 Claims, 8 Drawing Sheets

U.S. PATENT DOCUMENTS

| | | | |
|---|---|---|---|
| 2004/0251716 A1* | 12/2004 | Choi et al. | 296/187.03 |
| 2006/0011434 A1* | 1/2006 | Itou | 188/372 |
| 2009/0025995 A1* | 1/2009 | Wang et al. | 180/69.2 |
| 2009/0026807 A1* | 1/2009 | Wang et al. | 296/193.11 |
| 2009/0065277 A1* | 3/2009 | Wang et al. | 180/69.2 |
| 2009/0167060 A1* | 7/2009 | Zanolin et al. | 296/193.11 |
| 2009/0195020 A1* | 8/2009 | Wang et al. | 296/187.09 |
| 2010/0314907 A1* | 12/2010 | Iwano et al. | 296/187.09 |
| 2011/0139533 A1* | 6/2011 | Schaefer et al. | 180/274 |

* cited by examiner

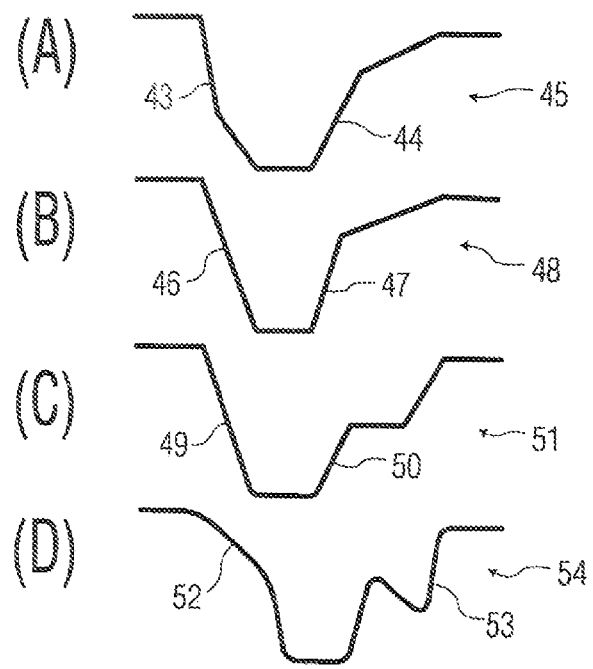
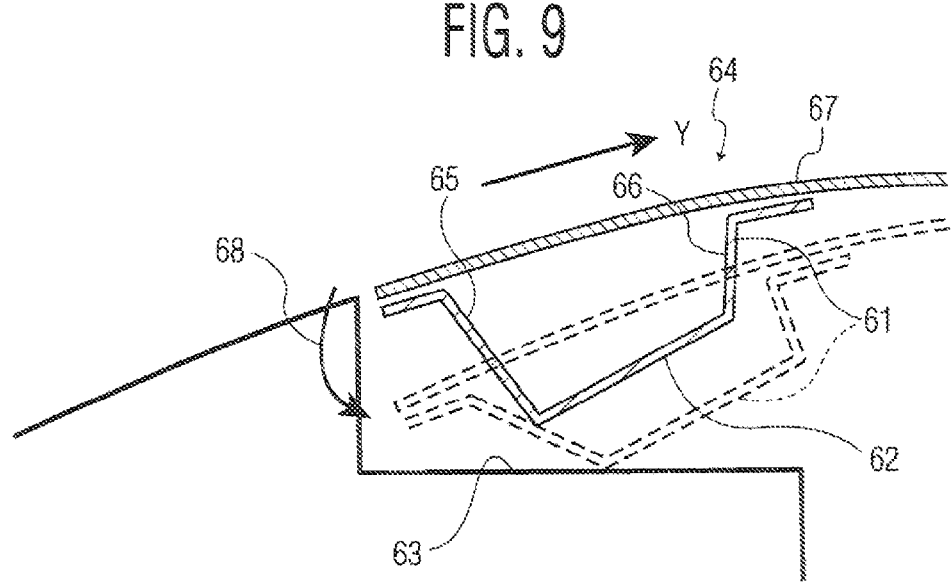

BONNET FOR AUTOMOBILE HAVING AUTOMOBILES THAT PROTECTS THE HEADS OF PEDESTRIANS

RELATED APPLICATION

This is a §371 of International Application No. PCT/JP2005/015646, with an international filing date of Aug. 29, 2005 (WO 2006/025315 A1, published Mar. 9, 2006), which is based on Japanese Patent Application No. 2004-252335, filed Aug. 31, 2004.

TECHNICAL FIELD

The technology in this disclosure relates to a bonnet for an automobile made from an FRP (fiber reinforced plastic), and specifically, relates to a bonnet for an automobile capable of effectively absorbing an impact load and having an excellent productivity.

BACKGROUND ART

Recently, enhancement of safety at a collision accident etc. has been required for an automobile, and in particular, enhancement of performance for protecting a pedestrian at an accident etc. as well as enhancement of safety for a passenger side, when an impactive external force is applied, have been required. When an automobile collides with a pedestrian, the pedestrian receives an impact load to the leg or the head against a front portion, a bonnet, etc. of the automobile and, particularly, to reduce deadly accidents, it is said that it is desirable to reduce damage to the head. Therefore, for a bonnet which is likely to damage the head, it is required to absorb an impact force as much as possible even at the time of collision, thereby suppressing the damage to the head.

With respect to this reduction of damage to the head, regulations on impact relaxation performance of a bonnet are being standardized, and in particular, a head injury criterion (HIC), which is calculated by an acceleration received by the head and the duration thereof, is required to be suppressed at a predetermined value or less. Further, together with such an impact relaxation performance, when a bonnet is deformed toward the inside (that is, the side of an engine room) at the time of collision to prevent the deformed bonnet from coming into contact with inner rigid mounted materials, a rigid vehicle body, etc. to give an excessive impact to the head, an amount of deformation of the bonnet is required to be suppressed at a predetermined level or less, although the level is different depending upon the kind of automobile. Namely, from the viewpoint of protection of a pedestrian, while a property wherein a bonnet can be deformed in a desirable manner and a high impact relaxation performance can be exhibited is required, it is required to suppress the amount of deformation of the bonnet at a predetermined level or less. Furthermore, from the viewpoint of protecting both pedestrians and passengers, when a bonnet is deformed at the time of collision accident, etc., it is desirable that the bonnet is bent in a dogleg-like shape.

By the way, although recently FRP bonnets for automobiles have been developed for a the purpose of lightening and various structures are proposed mainly to increase the strength and the rigidity of a required part (for example, JP-A-2003-146252), there is almost no proposal to form an adequate structure for a bonnet for an automobile, from the viewpoint of satisfying the above-described required performance at the time of collision.

Although various conventional FRP bonnets are proposed wherein an FRP bonnet comprises an FRP outer member forming a surface side and an FRP inner member bonded to the back-surface side of the outer member, the inner member of the conventional FRP bonnet is provided in the same layout as that of an inner member of a metal bonnet, or formed in a shape like a picture frame extending over the entire circumference of the outer member along the outer edge of the outer member. When such an inner member with a picture frame-like shape is bonded to an outer member, although the rigidity of the entire FRP bonnet can be maintained and the amount of deformation thereof can be suppressed, it becomes difficult to exhibit a desirable impact relaxation performance as aforementioned. Particularly, when attempting to achieve a bending deformation of a bonnet in a dogleg-like shape at the time of collision accident, etc., it becomes necessary to provide a constriction, which becomes a trigger of the bending deformation in a dogleg-like shape, to the inner member with a picture frame-like shape, the configuration of the entire inner member becomes complicated, and the difficulty of molding increases. Further, in the inner member with a picture frame-like shape as described above, at the time of molding the inner member, a large-sized mold having substantially the same size as that for an outer member is required, the scale of equipment becomes large, and the cost for production and difficulty of production increases.

Accordingly, paying attention to the aforementioned various performances required to a bonnet for an automobile at the time of collision and the above-described problems in conventional FRP bonnets, it could be advantageous to provide a bonnet made from FRP for an automobile which can satisfy such required performance at the time of collision and increase the easiness of production.

SUMMARY

We provide a bonnet for an automobile that has an outer member made from FRP and an inner member made from FRP which is joined to the back-surface side of the outer member, wherein the inner member is separated into two parts in a forward and backward direction of a vehicle body.

In such an FRP bonnet for an automobile, since a function as a structural member required with a necessary rigidity is given to the FRP outer member while the entire bonnet is maintained, even if the FRP inner member is formed as a divided structure, it becomes possible to satisfy the rigidity and function required for the entire bonnet for an automobile. Namely, this divided structure of the inner member can be said to be a structure capable of being employed peculiarly to an FRP bonnet, and usually this structure is not employed for a metal bonnet because, if such an inner divided structure is employed, the number of inner member forming processes (for example, press forming processes) increases and the efficiency decreases as compared to a case where an integral product is formed in a single process. In the case of FRP, however, as long as molds for the respective divided inner parts are prepared, it becomes possible to employ the inner divided structure without particularly reducing the efficiency.

In the above-described bonnet for an automobile, it is preferred that at least a part of the above-described inner member has a hat-shape cross section, and the respective divided inner parts may have hat-shape cross sections substantially over the entire parts. In such a structure, even if the inner member is divided and disposed partially relatively to the outer member, the inner member can effectively function as a stiffener for the positions disposed, and desired strength and rigidity required for the respective portions can be easily provided.

Further, a structure can be employed wherein the two parts of the inner extend in a transverse direction of the vehicle body substantially over the entire width of the outer member, respectively. In this case, it is preferred that at least one part of the inner member further has a portion extending along an outer edge of the outer member. Namely, a shape extending along the outer edge of the outer member after extending in the transverse direction of the vehicle body is preferably employed.

As the above-described outer member, as long as a required rigidity can be ensured, may be employed any of a structure wherein the outer member comprises an FRP single plate and a structure wherein at least a part of the outer member has a sandwich structure in which a core material is interposed between FRP skin plates. To ensure a required rigidity, it is preferred that carbon fibers are used as reinforcing fibers for at least an FRP of the outer member. However, the reinforcing fibers in the FRP bonnet for an automobile are not particularly limited. It is also possible to use other reinforcing fibers or to use carbon fibers together with the other reinforcing fibers.

The divided two parts of the inner member may be disposed in the forward and backward direction of a vehicle body with a space, or may be disposed in the forward and backward direction of a vehicle body at a substantially abutted condition. In any case, because a portion of the outer member present between the front and rear inner parts is not reinforced by the inner member, this portion of the outer member can become a trigger when the outer member bends in a dogleg-like shape, and it becomes possible that the outer member bends in a dogleg-like shape at a desirable configuration in a desirable direction at the time of collision.

Further, to achieve the improvement of the performance for protecting the head of a pedestrian at the time of collision more effectively, a structure is preferred wherein the difference in rigidity is provided between the two parts of the inner member. In particular, it is preferred that a rigidity of a part of the inner member at a rear side of the vehicle body is set adequately at a condition with a difference as compared with the rigidity of a front-side part of the inner member. To give a difference in rigidity between both inner parts includes providing a difference between rigidities in sections at standing surfaces extending in the forward and backward direction of a vehicle body, and to provide a difference between rigidities in sections at standing surfaces extending in the transverse direction of the vehicle body.

More concretely, a structure can be employed wherein rigidity of a part of the inner member at a rear side of the vehicle body is set less than the rigidity of a front-side part of the inner member (case A). In this case, for example, it is possible to reduce an acceleration generated to the head at a middle stage in the acceleration/time chart at the time of collision. As a result, the head injury criterion (HIC) decreases and the impact relaxation performance increases. This phenomenon is due to a condition where, because the rigidity of the rear side inner part among both inner parts joined to the back surface side of the outer member is set to be less, at the middle stage at which an impact is supported by the whole of the bonnet after the outer member receives a head hit, a mode in which a deformation due to the hit spreads toward a rear side with a low rigidity is generated, the acceleration of the head is reduced, and the impact relaxation performance increases. In other words, the impact relaxation performance is increased by widening the spreading direction of the distribution of the deformation at the head, in addition to the transverse direction of the vehicle body due to the divided structure of the inner member, toward the side of the rear inner part with a low rigidity, that is, toward the backward direction of the forward and backward direction of the vehicle body.

Alternatively, a structure can also be employed wherein rigidity of a part of the inner member at a rear side of the vehicle body is set greater than a rigidity of a front-side part of the inner member (case B). In this case, it is possible to increase the torsional rigidity of the whole of the bonnet which is a basic property of the bonnet. Namely, as described later, the rear inner part is frequently connected to the vehicle body side at both ends via hinge members, and this rear inner part functions as a kind of torsion bar at the time of load transmission. Therefore, it becomes possible to effectively increase the torsional rigidity of the whole of the bonnet by increasing the rigidity of this load transmission portion.

Because the above-described case A and case B are in a trade-off relationship with respect to exhibiting the property for protecting the head of a pedestrian and the torsional rigidity of the whole of the bonnet, in a practical design, an optimum point of both properties is found.

To give the above-described difference in rigidity between both inner parts can be achieved by the following difference in structure between both inner parts or a combination thereof. For example, it can be achieved by a structure wherein the difference in rigidity is provided by a difference in cross-sectional shape between both parts of the inner member (for example, difference in width, height or thickness), a structure wherein the difference in rigidity is provided by a difference in lamination structure of FRP between FRPs forming both parts of the inner member (for example, directions of respective layers or volume contents of reinforcing fibers of respective layers), a structure wherein the difference in rigidity is provided by a difference in kind of reinforcing fiber of FRP between FRPs forming both parts of the inner member (for example, carbon fibers, glass fibers, etc., or combination ratio thereof), etc.

A striker can be attached to a part at a front side of the vehicle body of the inner member, and a hinge attaching fitting can be attached to a part at a rear side of the vehicle body of the inner member. By this, the attachment and operation functions required for the whole of the FRP bonnet can be easily satisfied.

Furthermore, as a method for providing a difference in rigidity between front and rear inner parts or bonnet portions joined with respective inner parts, the following method can be employed. For example, in a case where hinge attaching fittings are attached to both sides in a transverse direction of the vehicle body of a part at a rear side of the vehicle body of the inner member, a structure can be employed wherein a distance between both hinge attaching fittings determined along the rear-side inner part is longer than a distance between both hinge attaching fittings determined linearly. In this structure, the distance determined along the rear-side inner part is longer than the distance between both hinge attaching fittings determined linearly by 1.2 times or more. Concretely, even in a case where the rear-side inner part has a same rigidity, for example, by enlarging the spreading length of the inner part toward the front side of the vehicle body, the distance from the attachment point to the vehicle body (hinge) becomes longer, an easier deflection property is exhibited (that is, an apparent rigidity reduces), and therefore, the impact relaxation performance can be further increased.

Alternatively, a structure can also be employed wherein a difference is provided between lengths of the two parts of the inner member in a transverse direction of the vehicle body. In this case, in particular, it is preferred that a length of a part at a rear side of the vehicle body of the inner member in the transverse direction of the vehicle body is greater than a length of a part at a front side of the vehicle body of the inner member in the transverse direction of the vehicle body. In most of known bonnets, mainly from the viewpoint of design, the width of the front side is smaller and the width of the rear side is greater. Therefore, the above-described structure, wherein a difference is provided between lengths of the two parts of the inner member in the transverse direction of the vehicle body, can be employed relatively easily. By providing a difference in length between the two parts of the inner member, particularly by setting the length of the rear-side inner part in the transverse direction of the vehicle body greater than the length of the front-side inner part in the transverse direction of the vehicle body, it becomes possible to deflect the rear-side portion of the bonnet more easily, enlarge spreading of the distribution of the deformation at the time of the impact to the head, and further increase the impact relaxation performance.

In a case where the structure is employed wherein the distance between both hinge attaching fittings determined along the rear-side inner part is longer than the distance between both hinge attaching fittings determined linearly or in a case where the structure is employed wherein a difference is provided between lengths of the two parts of the inner member in the transverse direction of the vehicle body as the above-described method for providing a difference in rigidity between front and rear inner parts or bonnet portions joined with respective inner parts, the inner parts may not always be disposed completely along the outer edge of the outer member. Although the position of the outer edge of the outer member is frequently decided from the viewpoint of the design of the vehicle body, the inner member may be present within the inside relative to the position of the outer edge of the outer member and, therefore, the disposition and the dimension of the inner member may be decided from the condition for providing the necessary rigidity or difference in rigidity.

Further, in a case of an FRP bonnet having a light and high-rigidity outer member, an inner member joined to the outer member (including an inner member divided into two parts in a forward and backward direction of a vehicle body) is frequently disposed along an outer edge of the outer member and frequently is not disposed in a central portion. In such a case, the device on the inner member cannot be applied in the central portion of the bonnet. In particular, in a case of an outer member formed from a carbon fiber reinforced plastic (CFRP) as aforementioned, because of its high rigidity, the whole of the bonnet moves vertically while a certain shape thereof is maintained as it is, and therefore, the energy absorbing performance is rapidly damaged when the inner member disposed along the outer edge of the outer member comes into contact with the vehicle body or a mounted inside material, and the damage to a pedestrian may become great. Accordingly, in the bonnet for an automobile, as described below, a structure is preferably employed together wherein, by adding a device to the structure of the inner member in the bonnet for an automobile having an FRP outer member with a high rigidity, the energy absorbing performance of the bonnet body may not be rapidly damaged when the inner member comes into contact with the vehicle body or the rigid mounted material, and a desirable energy absorbing performance can be exhibited as the whole of the bonnet at the time of collision.

Namely, it is preferred to employ a structure wherein the above-described inner member has a stiffener structure formed in a hat shape in cross section, and at least a part of the inner member has a great deformation possible sectional portion formed as a structure capable of being greatly deformed at a rising surface part of the hat shape by a vertical load (a great deformation possible section inner structure), or a structure wherein at least a part of the above-described inner member has a stiffener structure formed in a schematic hat shape in cross section, a bottom surface of the inner member is inclined relative to a vehicle body-side facing surface, and the inner member is formed in a rotational deformation possible shape in which a rotational deformation of the inner member toward a central portion side in a plane direction of the bonnet is possible after a part of the bottom surface of the inner member comes into contact with the vehicle body-side facing surface (a rotational deformation possible inner structure).

In the great deformation possible sectional portion in the above-described great deformation possible section inner structure, either a structure may be employed wherein both rising surface parts of the hat shape are formed as a structure capable of being greatly deformed by a vertical load, or a structure may be employed wherein one of both rising surface parts of the hat shape is formed as a structure capable of being greatly deformed by a vertical load.

Further, either a structure may be employed wherein the great deformation possible sectional portion is provided in a portion of the inner member extending in a transverse direction of the vehicle body partially in an extending direction of the portion of the inner member, or a structure may be employed wherein it is provided over the entire length thereof in the extending direction.

Further, either a structure may be employed wherein the great deformation possible sectional portion is provided in a portion of the inner member extending along an outer edge of the outer member partially in an extending direction of the portion of the inner member, or a structure may be employed wherein it is provided over the entire length thereof in the extending direction.

Further, a structure may be employed wherein the inner member has both of the great deformation possible sectional portion and a usual sectional portion which is not formed as a structure capable of being greatly deformed at a rising surface part of the hat shape by a vertical load, and a sectional structure is gradually changed between the great deformation possible sectional portion and the usual sectional portion.

The above-described great deformation possible sectional portion can be formed as various structures. For example, the great deformation possible sectional portion can be formed by forming a rising surface part of the hat shape as a polygonal line shape. Alternatively, the great deformation possible sectional portion can also be formed by forming a rising surface part of the hat shape as a stepped shape. Alternatively, the great deformation possible sectional portion can also be formed by forming a rising surface part of the hat shape as a curved shape. Alternatively, the great deformation possible sectional portion can also be formed by making the thickness of a rising surface part of the hat shape partially small. Still alternatively, the great deformation possible sectional portion can also be formed by partially changing the lamination structure of an FRP of a rising surface part of the hat shape.

Further, for the inner member having the above-described stiffener structure formed in the hat shape in cross section, an FRP plate structure (a structure comprising an FRP single plate) can be employed. As the outer member, although an FRP single plate structure can be employed, to provide high rigidity to the whole of the outer member, it is preferred that at least a part of the outer member has a sandwich structure in which a core material is interposed between FRP skin plates.

In an FRP bonnet for an automobile having such a great deformation possible section inner structure, while lightness is maintained, basically, a function as a structural member having a necessary rigidity is exhibited by the FRP outer member, the FRP inner member is joined relative to the portions of the outer member lack in rigidity, and a bonnet having a necessary rigidity as a whole is structured.

Then, when the bonnet having the outer member with a high rigidity absorbs an impact applied from a head etc. at the time of a collision as collision energy by being deformed vertically, the vertical movement is made smooth by a condition where the great deformation possible sectional portion provided in the inner member starts to be deformed without propping up at the time of contact of the inner member with the vehicle body side, and a rapid reduction of the energy absorbing performance can be prevented. Further, by deformation of the inner member itself, it is possible to exhibit a more desirable energy absorbing performance.

Further, in a case having the above-described rotational deformation possible inner structure, a structure can be employed wherein at least one of rising surface parts of the schematic hat shape is formed as a great deformation possible sectional portion capable of being greatly deformed by a vertical load.

Further, either a structure can be employed wherein a sectional portion having the rotational deformation possible shape is provided in a portion of the inner member extending in a transverse direction of the vehicle body partially in an extending direction of the portion of the inner member, or a structure can be employed wherein a sectional portion having the rotational deformation possible shape is provided in a portion of the inner member extending along an outer edge of the outer member partially in an extending direction of the portion of the inner member.

Further, a structure can also be employed wherein the inner member has both of a sectional portion having the rotational deformation possible shape and a usual sectional portion which is not formed in a rotational deformation possible shape, and a sectional structure is gradually changed between the rotational deformation possible sectional portion and the usual sectional portion.

Further, the above-described great deformation possible sectional portion can be formed as various structures. For example, the great deformation possible sectional portion can be formed by forming a rising surface part of the schematic hat shape as a polygonal line shape. Alternatively, the great deformation possible sectional portion can also be formed by forming a rising surface part of the schematic hat shape as a stepped shape. Alternatively, the great deformation possible sectional portion can also be formed by forming a rising surface part of the schematic hat shape as a curved shape. Alternatively, the great deformation possible sectional portion can also be formed by making a thickness of a rising surface part of the schematic hat shape partially small. Still alternatively, the great deformation possible sectional portion can also be formed by partially changing a lamination structure of an FRP of a rising surface part of the schematic hat shape.

Further, the inner member having the stiffener structure formed in the schematic hat shape in cross section can be formed as an FRP plate structure (a structure comprising an FRP single plate). As the outer member, although an FRP single plate structure can be employed, to impart a high rigidity to the whole of the outer member, it is preferred that at least a part of the outer member has a sandwich structure in which a core material is interposed between FRP skin plates.

In an FRP bonnet for an automobile having such a rotational deformation possible inner structure, while lightness is maintained, basically, a function as a structural member having a necessary rigidity is exhibited by the FRP outer member, the FRP inner member is joined relative to the portions of the outer member lack in rigidity, and a bonnet having a necessary rigidity as a whole is structured.

Then, when the bonnet having the outer member with a high rigidity absorbs an impact applied from a head etc. at the time of collision as collision energy by being deformed vertically, the bottom surface of the inner member inclined relative to the vehicle body-side facing surface comes into contact with the vehicle body-side surface, after a part of the bottom surface of the inner member comes into contact with the vehicle body-side facing surface, the inner member formed in the rotational deformation possible shape begins to be rotationally deformed toward the inside of the vehicle body. Because this rotational deformation is directed not to a direction out from the vehicle body, but to a direction being rotated toward the inside of the vehicle body, at a condition where there are fewer obstructions, the inner member can be deformed and the outer member joined with the inner member can also be deformed in the same direction. Further, by this rotational deformation, a rotational moment is generated. By these rotational deformation of the inner member and generation of the rotational moment associated therewith, the collision energy at the time of collision can be absorbed more smoothly, and the collision energy absorbing performance can be increased. Namely, the vertical movement of the bonnet can be made smooth by a condition where the rotational deformation begins even after the inner member comes into contact with the vehicle body-side facing surface and without being obstructed by the vehicle body side. Hence, a rapid reduction of the energy absorbing performance can be prevented. Further, by deformation of the inner member itself, it is also possible to exhibit an energy absorbing performance.

In the bonnet for an automobile, the boundary portion present between the front and rear parts of the inner member in the forward and backward direction of the vehicle body becomes a low-rigidity portion as the whole of the bonnet, and at the time of collision accident, etc., in particular, at the time of a head-on collision, it becomes possible that the outer member is bent in a desirable direction and at a desirable form of a dogleg-like shape, and an excellent impact relaxation performance can be exhibited. Therefore, it becomes possible to satisfy the requirement for protecting a pedestrian at the time of collision, and because the direction of the dogleg-like shape bending can be specified, protection of passengers can be achieved at the same time.

Further, because the dimensions of the respective divided parts of the inner member can be made small by dividing the inner member into two parts in the forward and backward direction of the vehicle body, molds etc. may be small, the scale of the equipment for production can be made small, and the cost for the equipment can be reduced and the equipment can be manufactured easily. Further, because the respective inner parts become small, the positioning thereof relative to the outer member can be facilitated, and the accuracy for positioning at the time of joining can be improved.

Further, by adequately imparting a difference in rigidity between the two inner parts, spreading the distribution of the deformation at the time of head hit can be widened in a desirable direction, and a further excellent impact relaxation performance can be exhibited.

Further, although for an inner member, usually, it is required to attach a striker to its front portion and hinge attaching fittings to both sides of its rear portion, by forming the inner member divided into two parts, the respective attaching members can be easily attached to the respective inner parts, and a necessary function can be easily provided.

Further, in a case of employing the great deformation possible section inner structure, by providing the great deformation possible sectional portion to the inner member, even if the inner member comes into contact with the vehicle body side at the time of a vertical deformation of the outer member, a rapid reduction of the energy absorbing performance of the whole of the bonnet can be prevented, the impact given to a pedestrian at the time of collision can be suppressed small, and it becomes possible to protect the pedestrian more adequately.

Further, because energy absorbing performance can be exhibited by deformation of the inner member having the great deformation possible sectional portion itself, the energy absorbing performance of the whole of the bonnet may be increased.

Further, in a case of employing the rotational deformation possible inner structure together, because the bottom surface of the inner member having the schematic hat-shape section is inclined relative to the vehicle body-side facing surface and the inner member can be rotated toward a central portion side in a plane direction of the bonnet without being obstructed by the vehicle body side after a part of the bottom surface of the inner member comes into contact with the vehicle body-side facing surface, and a desirable rotational moment can be generated, even if the inner member comes into contact with the vehicle body side at the time of a vertical deformation of the outer member, a rapid reduction of the energy absorbing performance of the whole of the bonnet can be prevented, the deformation of the inner member, ultimately, the whole of the bonnet, can happen smoothly, the impact given to a pedestrian at the time of collision can be suppressed, and it becomes possible to protect the pedestrian more adequately.

Furthermore, because an energy absorbing performance can be exhibited by the deformation of the inner member having the rotational deformation possible sectional portion itself, the energy absorbing performance of the whole of the bonnet may be further increased.

BRIEF EXPLANATION OF THE DRAWINGS

FIG. 8 is a schematic cross-sectional view of an inner portion, showing each of other examples of great deformation possible sectional portions;

FIG. 9 is a schematic cross-sectional view of an inner portion, showing an example of a rotational deformation possible sectional portion;

Figure 1:
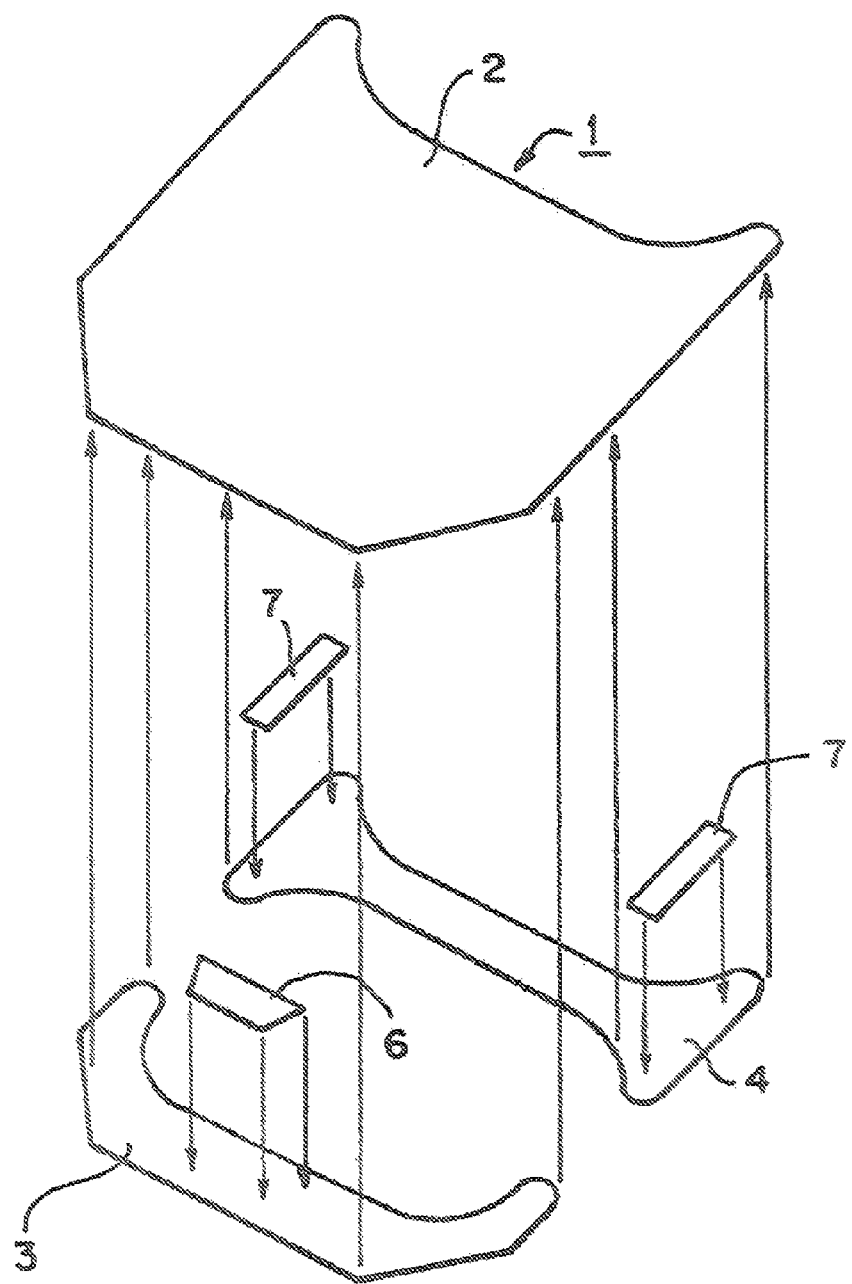
FIG. 1 is an exploded perspective view of a bonnet for an automobile according to an embodiment.

1, 11: bonnet for automobile
2, 12: FRP outer member
3, 13: FRP front inner member
4, 14: FRP rear inner member
5: hat-shape cross section of inner member
6: striker
7: hinge attaching fitting
21: conventional bonnet for automobile
22: FRP outer member
23, 24: FRP skin plate
25: core material
26: FRP inner member
27: vehicle body side
28: head of pedestrian at collision accident etc.
29, 30: straight rising surface part of hat shape
31, 32, 34, 35, 37, 38, 40, 41, 43, 44, 46, 47, 49, 50, 52, 53: rising surface part of hat shape
33, 36, 39, 42, 45, 48, 51, 54: sectional structure of hat-shape inner member
61: inner member having rotational deformation possible section
62: bottom surface of inner member
63: vehicle body-side facing surface
64: bonnet
65, 66: rising surface part of schematic hat shape
67: outer member
68: rotational moment
71, 72, 74, 75, 77, 78, 80, 81: rising surface part of schematic hat shape
73, 76, 79, 82, 91, 92, 93, 94: sectional structure of schematic hat shape

DETAILED DESCRIPTION

Hereinafter, desirable embodiments will be explained referring to the figures:

FIG. 1 shows a bonnet for an automobile according to one embodiment. In FIG. 1, symbol 1 shows the whole of the bonnet for an automobile, and the bonnet 1 comprises an FRP outer member 2 positioned at a surface side, and FRP front inner member 3 and rear inner member 4 which are joined to the back surface side of the outer member and separated into two parts in a forward and backward direction of a vehicle body. FRP outer member 2 is spread in a plane direction over the entire surface of the bonnet, and formed as a curved shape required depending upon the kind of automobile. This outer member 2 may be formed as an FRP single plate structure, or may be formed as a sandwich structure in which a core material (for example, a core material formed from a foamed material) is interposed between FRP skin plates. Although it is possible to form front inner member 3 and rear inner member 4 as sandwich structures, because a desirable rigidity can be easily ensured by joining them to outer member 2 at a single-plate and desirable-stiffener structure, it is preferred to form them as single plate structures.

Figure 2:
FIG. 2 is an enlarged cross-sectional view of an inner portion depicted in FIG. 1.

To give a desirable stiffener function to each of inner members 3 and 4, for example, as shown in FIG. 2, it is preferred to form the cross section of the inner member in a hat shape.

Although hat-shape cross section 5 can be formed partially relative to each inner member, because the inner member is divided into two parts of inner members 3 and 4 and the inner member is not disposed at an unnecessary position, it is preferred to form each inner member in a hat-shape cross section substantially over the whole.

Figures 12A, 12B:
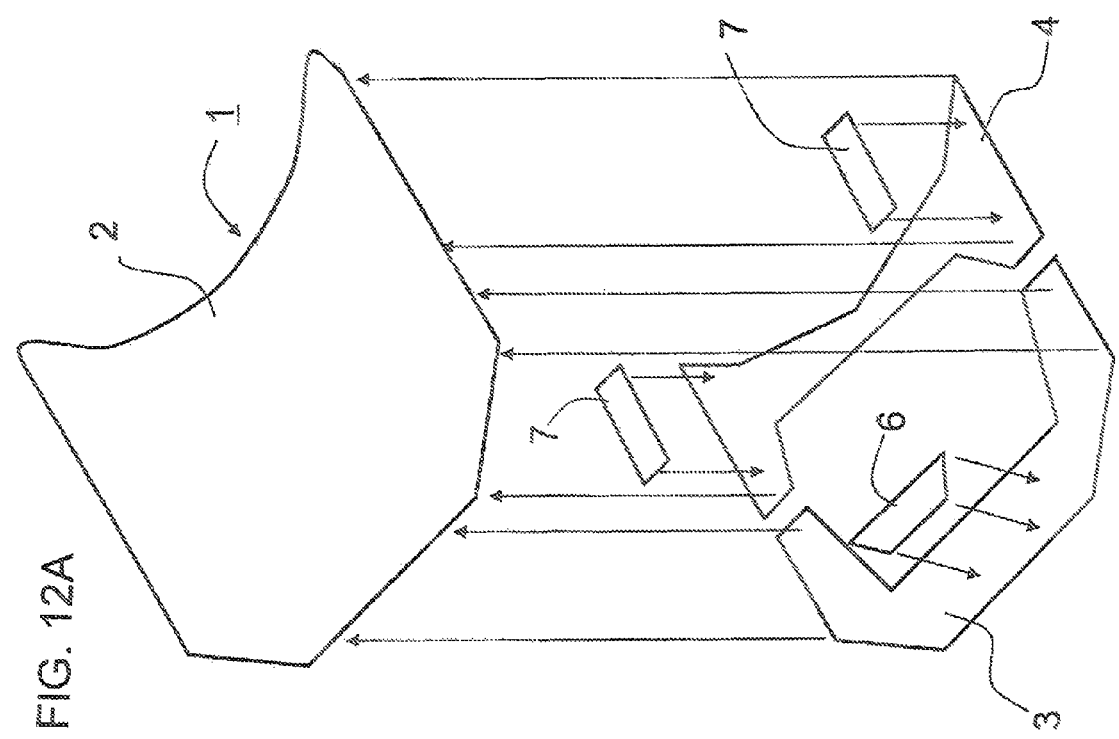
FIG. 12A is an exploded perspective view of a bonnet for an automobile according to another embodiment with elongated side edges.
FIG. 12B is a perspective view of a bonnet formed from an outer member and a pair of abutted inner members.

In this embodiment, front inner member 3 extends in the transverse direction of a vehicle body substantially over the entire width of outer member 2, and further has portions each shortly extending along the outer edge of outer member 2 at both side portions. Rear inner member 4 also extends in the transverse direction of a vehicle body substantially over the entire width of outer member 2, and further has portions each shortly extending along the outer edge of outer member 2 at both side portions. These front inner member 3 and rear inner member 4 are disposed in the forward and backward direction of a vehicle body with a space. However, it is possible to dispose both inner members at a condition where the portions shortly extending along the outer edge of outer member 2 are abutted to each other as shown in FIGS. 12A & 12B. In any case, because reinforcement of outer member 2 by joining them to outer member 2 is not carried out in the boundary portion between front inner member 3 and rear inner member 4, this boundary portion becomes a low-rigidity portion extending in the transverse direction of a vehicle, and it becomes a trigger portion for bending deformation at a dogleg shape of outer member 2 at the time of a head-on collision, etc.

A striker 6 is attached to front inner member 3 as a engaging member for opening/closing the bonnet via an adhesive or a bolt, etc. Fittings 7 for attaching a hinge (not shown) for operation of opening/closing the bonnet (operation of rotation) are attached to both sides of rear inner member 4, and these hinge attaching fittings 7 may be attached via an adhesive or a bolt, etc.

FRP in the bonnet for an automobile means a resin reinforced by reinforcing fibers, and as the reinforcing fibers, for example, inorganic fibers such as carbon fibers and glass fibers, and organic fibers such as KEVLAR® polyamide fibers, polyethylene fibers and polyamide fibers, can be exemplified. From the viewpoint of easy control of plane rigidity, particularly carbon fibers are preferred. As the matrix resin of FRP, for example, a thermosetting resin such as an epoxy resin, an unsaturated polyester resin, a vinylester resin and a phenolic resin can be exemplified, and further, a thermoplastic resin such as a polyamide resin, a polyolefine resin, a dicyclopentadiene resin and a polyurethane resin also can be used. Although it is possible to form FRP comprising these reinforcing fibers and matrix resin as a single layer structure, in order to exhibit a desirable property (in particular, a desirable flexural rigidity or torsional rigidity in a specified direction), a lamination structure is preferred. Further, the mechanical properties of FRP can be appropriately set by selection or combination of the above-described reinforcing fibers and matrix resin, orientation and volume content of the reinforcing fibers, the lamination structure, etc. In addition to these, the rigidity of the inner member and a difference in rigidity between inner parts can be appropriately set by a sectional shape of inner member (width, height, thickness, etc.), a length of inner member itself, extending shape of inner member, etc. Further, as the core material in a case of employing a sandwich structure, an elastic material, a foamed material or a honeycomb material can be used, and for the purpose of lightening, a foamed material is particularly preferred. The material of the foamed material is not particularly limited, and for example, a foamed material of a polymer material such as a polyurethane, an acrylic, a polystyrene, a polyimide, a vinyl chloride, a phenol, etc. can be used. The honeycomb material is not particularly limited, and for example, an aluminum alloy, a paper, an aramide paper, etc. can be used.

In the bonnet for an automobile 1 according to the above-described embodiment shown in FIGS. 1 and 2, outer member 2 exhibits a necessary plane rigidity required for the bonnet 1 as a main structural member, and rigidity components lack at the front and rear portions are supplemented by joining front inner member 3 and rear inner member 4 divided into two parts. Since the inner member is separated into two parts in the forward and backward direction of a vehicle body and particularly in this embodiment, a portion of the outer member therebetween is formed as a low-rigidity portion which is not reinforced by the inner member and extends in the transverse direction of the vehicle body, at the time of collision accident, etc. (in particular, at the time of a head-on collision), the portion becomes a trigger portion for a dogleg-like shape bending deformation, and from the viewpoint of relaxing an impact given to a pedestrian and protecting a crew, it becomes possible that the whole of bonnet 1 is bent in a desirable direction and at a desirable form of a dogleg-like shape.

Further, because the sizes of front inner member 3 and rear inner member 4 become much smaller that the size of a conventional picture-frame like inner member, the production thereof due to RTM molding or SMC molding is facilitated, molds therefor may be small, the scale of the equipment therefor may be small, and the cost for the equipment may be inexpensive. Further, because the small-sized front inner member 3 and rear inner member 4 are joined to outer member 2, the accuracy for positioning can be easily improved. Furthermore, attachment of striker 6 and hinge attaching fittings 7 to front inner member 3 and rear inner member 4 can be easily carried out, and functions required for operation can also be easily satisfied.

Further, as aforementioned, in order to increase the performance for protecting the head of a pedestrian at the time of collision more effectively, it is preferred to employ a structure wherein a difference in rigidity is given between two inner parts. To provide a difference in rigidity, for example, can be employed a structure providing a difference between cross-sectional shapes of both inner members, a structure providing a difference between lamination structures of FRPs forming both inner members, a structure providing a difference between kinds of reinforcing fibers of FRPs forming both inner members and, further, a structure providing a difference between lengths in the transverse direction of vehicle body of both inner members, in particular, a structure adding a device to the extending shape of the rear inner member.

Figure 3:
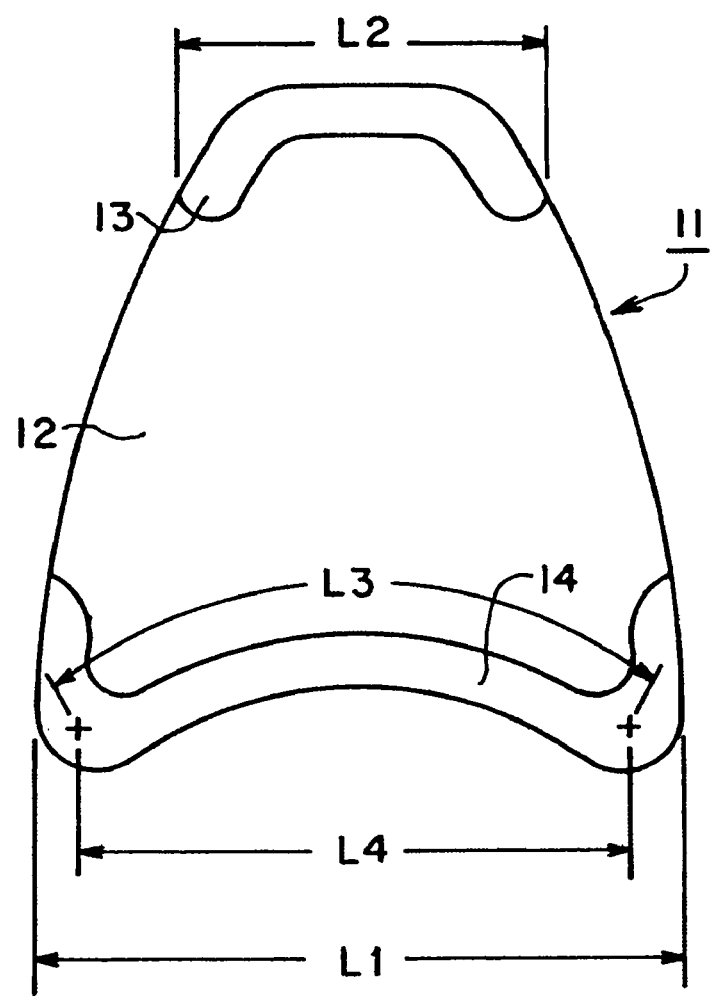
FIG. 3 is a schematic back view of a bonnet for an automobile according to another embodiment.

An example is shown in FIG. 3. In a bonnet for an automobile 11 shown in FIG. 3, a difference in length in the transverse direction of a vehicle body is given between FRP front inner member 13 and rear inner member 14 joined to FRP outer member 12, and a length L1 of rear inner member 14 is set longer than a length L2 of front inner member 13. Further, a distance L3 between both hinges determined along the shape of rear inner member 14 is set longer than a distance L4 between both hinges determined linearly, by 1.2 times or more. In such a structure, the distribution of the spreading of the deformation of the bonnet at the time of collision is adequately widened toward the rear side of the vehicle body, and the impact relaxation performance can be further increased. Although FIG. 3 shows each inner member completely along the outer edge of the outer member, the inner member may be present at an inside position within the outer edge of the outer member, and the outer edge of the outer member may be greater than the size of the inner member toward outside.

For the FRP inner member, a structure having a great deformation possible sectional portion (a great deformation possible section inner structure), or a structure formed in a rotational deformation possible shape capable of being rotationally deformed toward a central portion side in a plane direction of the bonnet (a rotational deformation possible inner structure), can be employed.

Figure 4:
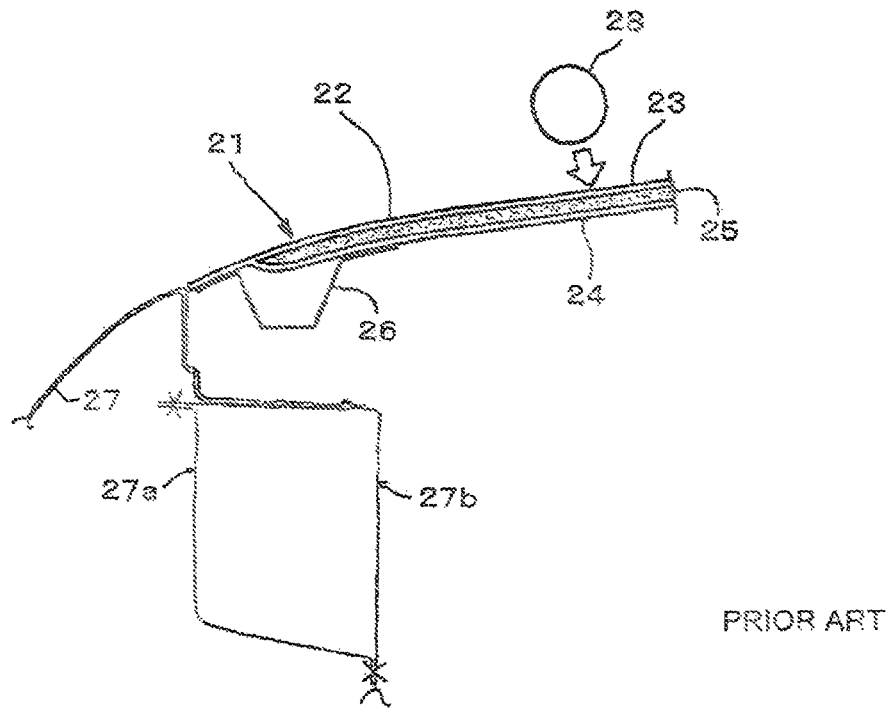
FIG. 4 is a schematic partial sectional view of a conventional FRP bonnet for an automobile.

First, the meaning of providing a great deformation possible sectional portion to the inner member will be explained referring to FIGS. 4 and 5. FIG. 4 shows a usual setting state of the front side of a conventional FRP bonnet for an automobile. In the FRP bonnet for an automobile 21 shown in the figure, an FRP outer member 22 is formed as a sandwich structure in which a core material 25 is interposed between FRP skin plates 23 and 24, and the circumferential edge portion is formed as an FRP single plate structure as an extended portion of FRP skin plate 23. It is also possible to form the FRP outer member as an FRP single plate structure over the entire area. An FRP inner member 26 is joined to a necessary portion at the back surface side of this FRP outer member 22. Inner member 26 functions as a stiffener for reinforcing a portion of outer member 22 lack in rigidity, and for example, as shown in the figure, it has a stiffener-structure cross section with a hat shape. In this FRP bonnet for an automobile 21, at a usual setting state, as shown in FIG. 4, a predetermined gap is provided between inner member 26 (in particular, the bottom surface of inner member 26) and the vehicle body side 27 including an inside mounted material (hereinafter, called as the "vehicle body side" including structural materials 27a, 27b, etc. shown in the figure).

Figure 5:
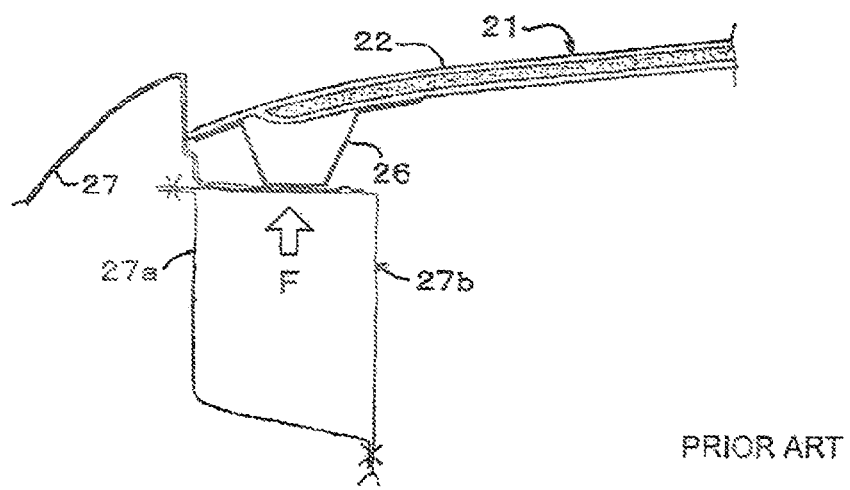
FIG. 5 is a schematic sectional view of the bonnet depicted in FIG. 4, showing a state where a reactive force is generated.
Figure 6:
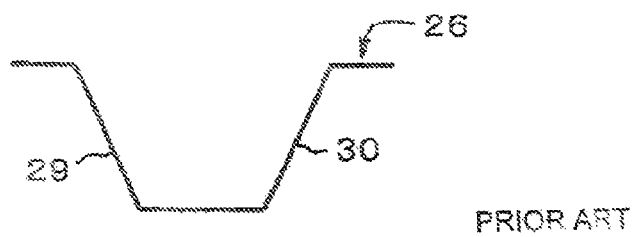
FIG. 6 is an enlarged cross-sectional view of an inner portion having a hat-shape section of the bonnet depicted in FIG. 4.

At this state, for example, if a head 28 of a pedestrian collides from an upper side at the time of collision, as shown in FIG. 5, the whole of bonnet 21 sinks, and by such a behavior, an impact applied to head 28 is absorbed to some extent. Then, when inner member 26 comes into contact with vehicle body side 27 of a rigid body, a reaction force F from the vehicle body side 27 is generated, the acceleration applied to head 28 rapidly increases, and the energy absorbing performance rapidly decreases. Since FRP inner member 26 has a cross section which has rising surface portions 29 and 30 on both sides of a hat shape as shown in FIG. 6, at the above-described contact time, a great reaction force is generated by being propped with These rising surface portions 29 and 30.

Accordingly, in a case where a great deformation possible section inner structure is employed, to reduce the above-described reaction force rapidly increased, at least a part of FRP inner member 26 is formed as a great deformation possible sectional portion capable of being greatly deformed by a vertical load. In particular, in a case where carbon fibers are used as reinforcing fibers of FRP, because the rigidity of the outer member is extremely high, the advantage due to this reduction of the reaction force by providing a great deformation possible sectional portion to FRP inner member 26 is great. To form this hat-shape stiffener-structure cross-sectional portion as a great deformation possible structure, for example, the'following various structures can be employed.

Figure 7:
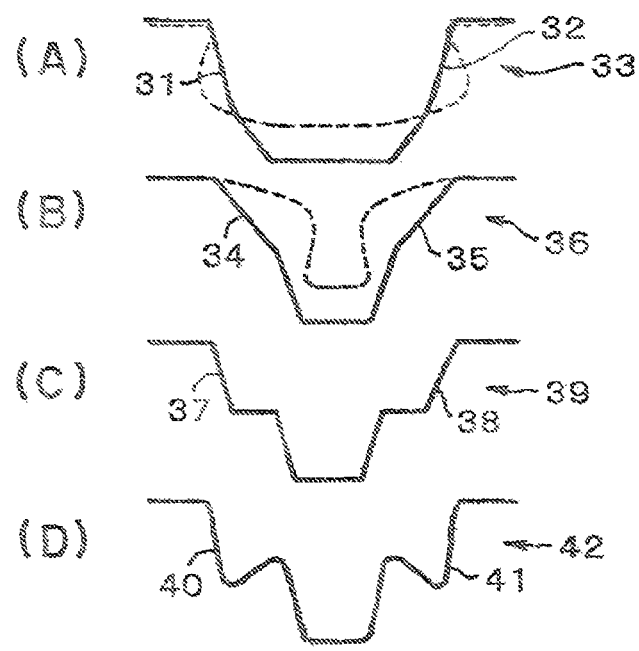
FIG. 7 is a schematic cross-sectional view of an inner portion in a bonnet for an automobile according to a further embodiment, showing each of examples of great deformation possible sectional portions.

First, to form a great deformation possible sectional portion by a shape of the cross section, for example, it can be formed as shown in FIG. 7 (A), (B), (C) or (D). In the inner cross-sectional structure shown in FIG. 7(A), a sectional structure 33 is employed wherein each of rising surface parts 31 and 32 at both sides of the hat shape is formed as a polygonal line shape protruding toward outside, and in the structure shown in FIG. 7(B), a sectional structure 36 is employed wherein each of rising surface parts 34 and 35 at both sides of the hat shape is formed as a polygonal line shape protruding toward inside. By employing such a sectional structure, as aforementioned, after the FRP inner member comes into contact with vehicle body side 27, a great deformation can be easily generated as shown in FIGS. 7(A) and 7(B) by dotted lines, by this, a rapid increase of acceleration applied to the head etc. of a pedestrian which has collided with the bonnet can be suppressed, the contact becomes soft, and the impact force is relaxed. Further, because the inner member itself deformed greatly can absorb the energy at that time, the energy absorbing performance as the whole of the bonnet is increased.

Further, in the inner cross-sectional structure shown in FIG. 7(C), a sectional structure 39 is employed wherein each of rising surface parts 37 and 38 at both sides of the hat shape is formed as a stepped shape, and in the structure shown in FIG. 7(D), a sectional structure 42 is employed wherein each of rising surface parts 40 and 41 at both sides of the hat shape is formed as a bent curved shape. Also in such a sectional shape, an excellent energy absorbing performance can be exhibited similarly to that in FIG. 7(A) or 7(B).

Further, as shown in FIGS. 8 (A), (B), (C) and (D), the above-described great deformation possible cross-sectional shapes can be combined arbitrarily for the rising surface parts at both sides of the hat shape, and further, it is possible to form a great deformation possible cross-sectional shape only on one rising surface part of the hat shape. In the inner cross-sectional structure shown in FIG. 8(A), a sectional structure 45 is employed wherein one rising surface part 43 of the hat shape is formed as a polygonal line shape protruding toward outside and the other rising surface part 44 is formed as a polygonal line shape protruding toward inside, and in the structure shown in FIG. 8(B), a sectional structure 48 is employed wherein one rising surface part 46 of the hat shape is left as a straight shape and only the other rising surface part 47 is formed as a polygonal line shape protruding toward inside. In the structure shown in FIG. 8(C), a sectional structure 51 is employed wherein one rising surface part 49 is left as a straight shape and only the other rising surface part 50 is formed as a stepped shape, and in the structure shown in FIG. 8(D), a sectional structure 54 is employed wherein one rising surface part 52 of the hat shape is formed as a shape curved toward inside and the other rising surface part 53 is formed as a bent curved shape. In such sectional structures, an excellent energy absorbing performance similar as described above is given, a deformation like a rotation toward the right side in each of FIGS. 8(A), 8(B), 8(C) and 8(D) can be easily performed, and it also becomes possible to give a directivity to the deformation of the inner member and to prevent a greatly deformed inner member from damaging an inside mounted important equipment.

Although a great deformation possible sectional portion is formed by the shape of the section in FIGS. 7 and 8, it is possible to form a great deformation possible sectional portion having a similar function by other methods. For example, it can be achieved by a structure wherein the thickness of a rising surface part of the hat shape of the FRP inner member is partially made smaller, or by a structure wherein the lamination structure of FRP of a rising surface part of the hat shape is partially changed. As the method for partially making the thickness smaller, for example, a method for partially reducing the number of the lamination of the reinforcing fiber layers of the rising surface part can be employed, and as the method for partially changing the lamination structure of FRP, for example, a method for partially changing the angle of the orientation of the reinforcing fibers of the reinforcing fiber layers laminated on the rising surface part to an angle easily deformed, a method for partially changing the kind of the reinforcing fibers, etc. can be employed.

In a case where the inner member is joined to a plurality of portions of the outer member, the above-described great deformation possible sectional portion can be set partially at a position to be required. For example, although there are many cases where a striker and the like is provided to a front part (front side of vehicle body) of the bonnet and hinge attaching fittings and the like are provided to a rear part thereof (rear side of vehicle body) and a high rigidity due to joining of the inner member has to be given to both parts, because side parts do not require such a high rigidity, it is preferred that the contact with a fender becomes soft and the above-described great deformation possible sectional portion is applied thereto. By this, as viewed as the whole of the bonnet, it becomes possible to enlarge an area having a high performance for protecting a head and the like. Further, also in the rear part, with respect to a portion other than the part attached with the hinge attaching fitting, the contact with the vehicle body side can be soft by employing the above-described great deformation possible sectional portion.

Furthermore, for example, in a case where the inner part extends by a predetermined length along the outer edge and the like of the outer member, it is also possible to provide the above-described great deformation possible sectional portion to a required portion in the extending direction of the inner part. In a case where the inner member has both of the great deformation possible sectional portion and a usual sectional portion which is not formed as a structure capable of being greatly deformed at a rising surface part of the hat shape by a vertical load (for example, a usual hat-shaped sectional portion as shown in FIG. 6), a structure can also be employed wherein the sectional structure is gradually changed between the great deformation possible sectional portion and the usual sectional portion. By this, without generating an undesirable stress concentration and the like in a boundary portion therebetween, it is possible to give a necessary rigidity and a necessary deformation property to each inner part.

Next, will be explained a case where a rotational deformation possible inner structure is applied to the inner member:

In a case where a great reaction force may be generated as shown in FIGS. 4 and 5, in order to reduce such a reaction force rapidly increased, an inner structure, for example, as shown in FIG. 9, can be employed. In the structure shown in FIG. 9, a part of inner member 61 has a cross section of a stiffener structure with a schematic hat shape, and a bottom surface 62 of inner member 61 is inclined relative to a facing surface 63 of vehicle body side. Further, inner member 61 is formed in a rotational deformation possible shape capable of being rotationally deformed toward a central portion in the plane direction of bonnet 64 (in the figure, in the arrow direction Y) after a part of bottom surface 62 of inner member 61 comes into contact with the vehicle body side facing surface 63. In the example shown in FIG. 9, this rotational deformation possible shape is formed by setting the lengths and rising angles of rising surface parts 65 and 66 of the schematic hat shape different from each other depending on the inclination of bottom surface 62.

In the bonnet 64 having such a structure, when an impact load is applied to outer member 67 from the upper side, the outer member 67 is deformed downward, a part of bottom surface 62 of inner member 61 (a corner portion) comes into contact with vehicle body side facing surface 63, and as shown by the dotted line in the figure, namely, it is deformed so as to be rotated toward the central portion side in the plane direction of bonnet 64 (in the figure, in the arrow direction Y). Because of deformation toward the inside of the vehicle body, as compared with deformation toward outside, the deformation can be performed at a condition where there is no obstruction, or even if there is an obstruction, it does not become a great obstruction, and the deformation is proceeded smoothly and softly. Further, accompanying with this rotational deformation, a rotational moment 68 is generated, and this rotational moment 68 operates so as to absorb a collision energy applied from outside. Moreover, because at that time the inner member 61 itself being rotationally deformed can absorb the energy, the energy absorbing performance as the whole of the bonnet can be further increased. In particular, in a case where carbon fibers are used as the reinforcing fibers of FRP, because the rigidity of outer member 67 is extremely high, by applying such a structure to FRP inner member 61, an extremely excellent relaxation effect can be obtained for the aforementioned reaction force from the vehicle body side. Therefore, the collision energy is smoothly absorbed, a desirable energy absorbing performance can be exhibited, and a pedestrian at the time of collision, particularly, the head of the pedestrian, is adequately protected.

In the bonnet for an automobile applied with such a rotational deformation possible inner structure, the inner member having the above-described structure is formed preferably as a structure wherein at least one of the rising surface parts of the schematic hat shape is further formed as a great deformation possible sectional portion capable of being greatly deformed by a vertical load. By this, the rapid increase of acceleration applied to the head and the like of a pedestrian having collided with the bonnet can be suppressed, the contact becomes soft, and the impact force can be further relaxed. In order to form this schematic hat-shape stiffener-structure cross-sectional portion as a great deformation possible structure, for example, the following various structures can be employed.

Figure 10:
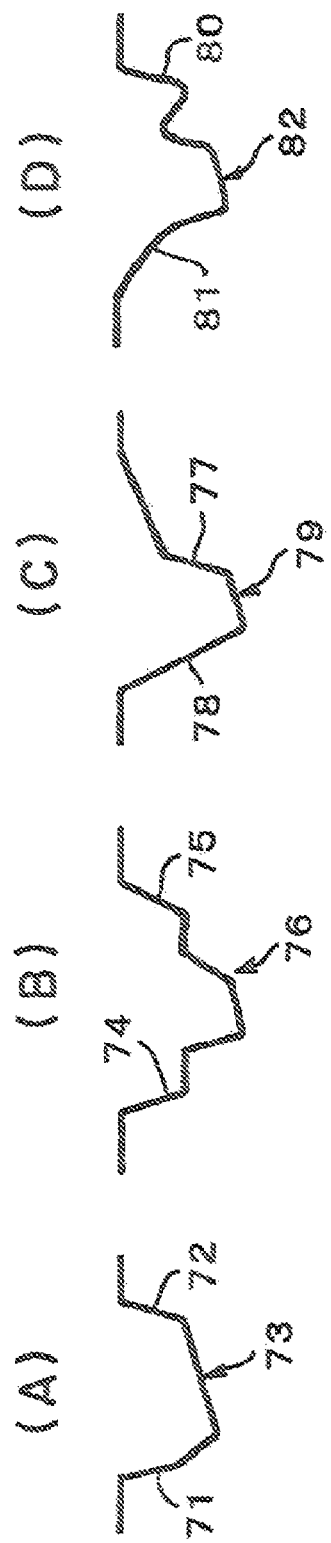
FIG. 10 is a schematic cross-sectional view of an inner portion, showing each of examples in a case where a great deformation possible sectional structure is added to a rotational deformation possible inner structure.

First, to form a great deformation possible sectional portion by a shape of the cross section, for example, it can be formed as shown in FIG. 10 (A), (B), (C) or (D). In the inner cross-sectional structure shown in FIG. 10(A), a sectional structure 73 is employed wherein one rising surface part 71 of the schematic hat shape is formed as a polygonal line shape protruding toward outside, and the other rising surface part 72 is formed as a straight shape, in the structure shown in FIG. 10(B), a sectional structure 76 is employed wherein rising surface parts 74 and 75 at both sides of the schematic hat shape are formed as stepped shapes, in the structure shown in FIG. 10(C), a sectional structure 79 is employed wherein one rising surface part 77 of the schematic hat shape is formed as a polygonal line shape protruding toward inside, and the other rising surface part 78 is formed as a straight shape, and in the structure shown in FIG. 10(D), a sectional structure 82 is employed wherein one rising surface part 80 of the schematic hat shape is formed as a curved bent shape, and the other rising surface part 81 is formed as a shape curved toward inside. Thus, by forming in a sectional shape having a great deformation possible sectional portion, a further excellent collision energy absorbing effect can be obtained.

The sectional shape having a great deformation possible sectional portion can further employ various shapes. For example, as shown in FIGS. 11 (A), (B), (C) and (D), schematic hat-shape inner sectional shapes 91, 92, 93 and 94 can be employed, and further, it is possible to employ shapes other than those depicted in the figures.

Figure 11:
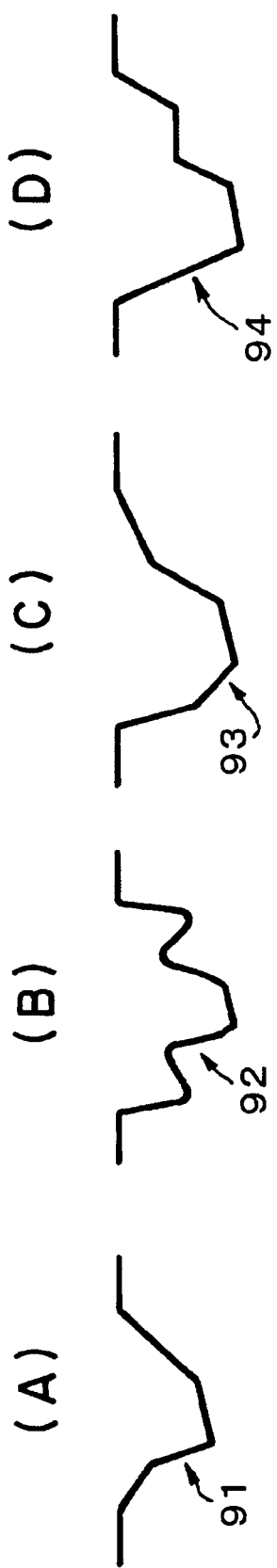
FIG. 11 is a schematic cross-sectional view of an inner portion, showing each of other examples in a case where a great deformation possible sectional structure is added to a rotational deformation possible inner structure.

Although a great deformation possible sectional portion is formed by the shape of the section in FIGS. 10 and 11, it is possible to form a great deformation possible sectional portion having a similar function by other methods. For example, it can be achieved by a structure wherein the thickness of a rising surface part of the schematic hat shape of the FRP inner member is partially made smaller, or by a structure wherein the lamination structure of FRP of a rising surface part of the schematic hat shape is partially changed. As the method for partially making the thickness smaller, for example, a method for partially reducing the number of the lamination of the reinforcing fiber layers of the rising surface part can be employed, and as the method for partially changing the lamination structure of FRP, for example, a method for partially changing the angle of the orientation of the reinforcing fibers of the reinforcing fiber layers laminated on the rising surface part to an angle easily deformed, a method for partially changing the kind of the reinforcing fibers, etc. can be employed.

In a case where the inner member is joined to a plurality of portions of the outer member, the sectional portion having the above-described rotational deformation possible portion and further the above-described great deformation possible sectional portion can be set partially at a position to be required. For example, although there are many cases where a striker and the like is provided to a front part (front side of vehicle body) of the bonnet and hinge attaching fittings and the like are provided to a rear part thereof (rear side of vehicle body) and a high rigidity due to joining of the inner member has to be given to both parts, in portions other than the portions attached with these members, an inner sectional shape capable of being greatly deformed can be employed. Further, because side parts of the bonnet do not require such a high rigidity, it is preferred that the contact with a fender becomes soft and the above-described rotational deformation possible portion and further the above-described great deformation possible sectional portion are applied thereto. By this, as viewed as the whole of the bonnet, it becomes possible to enlarge an area having a high performance for protecting a head and the like.

Further, for example, in a case where the inner part extends by a predetermined length along the outer edge and the like of the outer member, it is also possible to provide the above-described rotational deformation possible portion and further the above-described great deformation possible sectional portion to a required portion in the extending direction of the inner part. In a case where the inner member has both of the rotational deformation possible portion, further the great deformation possible sectional portion, and a usual sectional portion which is not formed as such a structure (for example, a usual hat-shaped sectional portion as shown in FIG. 6), a structure can also be employed wherein the sectional structure is gradually changed between the rotational deformation possible portion, the great deformation possible sectional portion, and the usual sectional portion. By this, without generating an undesirable stress concentration and the like in a boundary portion therebetween, it is possible to give a necessary rigidity and a necessary deformation property to each inner part.

Furthermore, the rotation direction of the inner member of the schematic hat-shape section is set in a direction toward a central portion side in a plane direction of the bonnet, as aforementioned. For example, as to the right side of a vehicle body (the driver seat side of a right handle automobile), it is set as a counter clockwise direction as viewed from the front side of the vehicle body, as to the left side of a vehicle body (the side of a seat beside the driver of a right handle automobile), as a clockwise direction as viewed from the front side of the vehicle body, as to a front edge, as a counter clockwise direction as viewed from the left side of the vehicle body, as to a front edge, as a clockwise direction as viewed from the left side of the vehicle body, respectively.

INDUSTRIAL APPLICATIONS

The FRP bonnet for an automobile can be applied to any bonnet for an automobile for which a lightness is required as a whole and an effective impact absorbing performance due to a predetermined deformation and an excellent productivity are required.

The invention claimed is:

1. A bonnet for an automobile constructed to protect heads of pedestrians comprising an outer member made from fiber reinforced plastic (FRP) and an inner member made from FRP joined to a back-surface side of said outer member, wherein said inner member has a stiffener structure formed in a hat shape in cross section, and at least a part of said inner member has a deformable sectional portion formed as a structure capable of being deformed at a rising surface part of said hat shape by a vertical load and consists of two separate parts longitudinally spaced apart from each other in a forward and backward position of a vehicle body, wherein at least a part of said inner member has a stiffener structure formed in a schematic hat shape in cross section, a bottom surface of said inner member is inclined relative to a vehicle body-side facing surface, and said inner member is formed in a rotational deformable shape in which a rotational deformation of said inner member toward a central portion side in a plane direction of said bonnet is possible after a part of said bottom surface of said inner member comes into contact with said vehicle body-side facing surface.

2. A bonnet for an automobile constructed to protect heads of pedestrians comprising an outer member made from fiber reinforced plastic (FRP) and an inner member made from FRP joined to a back-surface side of said outer member, wherein 1) said inner member has a stiffener structure formed in a hat shape in cross section, and at least a part of said inner member has a deformable sectional portion formed as a structure capable of being deformed at a rising surface part of said hat shape by a vertical load and consists of two separate parts longitudinally spaced apart from each other in a forward and backward position of a vehicle body, and 2) at least a part of said outer member has a sandwich structure in which a core material is interposed between FRP skin plates, wherein at least a part of said inner member has a stiffener structure formed in a schematic hat shape in cross section, a bottom surface of said inner member is inclined relative to a vehicle body-side facing surface, and said inner member is formed in a rotational deformable shape in which a rotational deformation of said inner member toward a central portion side in a plane direction of said bonnet is possible after a part of said bottom surface of said inner member comes into contact with said vehicle body-side facing surface.

3. The bonnet according to claim 2, wherein said outer member comprises an FRP single plate.

4. The bonnet according to claim 2, wherein carbon fibers are used as reinforcing fibers for at least an FRP of said outer member.

5. The bonnet according to claim 2, wherein said two parts of said inner member are disposed in said forward and backward direction of a vehicle body with a space.

6. The bonnet according to claim 2, wherein a striker is attached to a part at a front side of said vehicle body of said inner member.

7. The bonnet according to claim 2, wherein a hinge attaching fitting is attached to a part at a rear side of said vehicle body of said inner member.

8. The bonnet according to claim 2, wherein hinge attaching fittings are attached to both sides in a transverse direction of said vehicle body of a part at a rear side of said vehicle body of said inner member, and a distance between said both hinge attaching fittings determined along said part at a rear side of said vehicle body of said inner member is longer than a distance between said both hinge attaching fittings determined linearly.

9. The bonnet for an automobile according to claim 2, wherein said deformable sectional portion is formed as a structure capable of being deformed at a rising surface parts of said hat shape by a vertical load.

10. The bonnet according to claim 2, wherein said deformable sectional portion is formed as a structure capable of being deformed at one of both rising surface parts of said hat shape by a vertical load.

11. The bonnet according to claim 2, wherein said deformable sectional portion is provided in a portion of said inner member extending in a transverse direction of said vehicle body partially in an extending direction of said portion of said inner member.

12. The bonnet according to claim 2, wherein said deformable sectional portion is provided in a portion of said inner member extending along an outer edge of said outer member partially in an extending direction of said portion of said inner member.

13. The bonnet according to claim 2, wherein said inner member has both of said deformable sectional portion and a usual sectional portion which is not formed as a structure capable of being deformed at a rising surface part of said hat shape by a vertical load, and a sectional structure is gradually changed between said deformable sectional portion and said usual sectional portion.

14. The bonnet according to claim 2, wherein said deformable sectional portion is formed by forming a rising surface part of said hat shape as a polygonal line shape.

15. The bonnet according to claim 2, wherein said deformable sectional portion is formed by forming a rising surface part of said hat shape as a stepped shape.

16. The bonnet according to claim 2, wherein said deformable sectional portion is formed by forming a rising surface part of said hat shape as a curved shape.

17. The bonnet according to claim 2, wherein said deformable sectional portion is formed by making a thickness of a rising surface part of said hat shape partially small.

18. The bonnet according to claim 2, wherein said deformable sectional portion is formed by partially changing a lamination structure of an FRP of a rising surface part of said hat shape.

19. The bonnet according to claim 2, wherein said inner member having said stiffener structure formed in said hat shape in cross section is formed as an FRP plate structure.

20. The bonnet according to claim 2, wherein at least one of rising surface parts of said schematic hat shape is formed as a deformable sectional portion capable of being deformed by a vertical load.

21. The bonnet according to claim 2, wherein a sectional portion having said rotational deformable shape is provided in a portion of said inner member extending in a transverse direction of said vehicle body partially in an extending direction of said portion of said inner member.

22. The bonnet according to claim 2, wherein a sectional portion having said rotational deformable shape is provided in a portion of said inner member extending along an outer edge of said outer member partially in an extending direction of said portion of said inner member.

23. The bonnet according to claim 2, wherein said inner member has both of a sectional portion having said rotational deformable shape and a usual sectional portion which is not formed in a rotational deformable shape, and a sectional structure is gradually changed between said rotational deformable sectional portion and said usual sectional portion.

24. The bonnet according to claim 2, wherein said deformable sectional portion is formed by forming a rising surface part of said schematic hat shape as a polygonal line shape.

25. The bonnet according to claim 2, wherein said deformable sectional portion is formed by forming a rising surface part of said schematic hat shape as a stepped shape.

26. The bonnet according to claim 2, wherein said deformable sectional portion is formed by forming a rising surface part of said schematic hat shape as a curved shape.

27. The bonnet according to claim 2, wherein said deformable sectional portion is formed by making a thickness of a rising surface part of said schematic hat shape partially small.

28. The bonnet according to claim 2, wherein said deformable sectional portion is formed by partially changing a lamination structure of an FRP of a rising surface part of said schematic hat shape.

29. The bonnet according to claim 2, wherein said inner having said stiffener structure formed in said schematic hat shape in cross section is formed as an FRP plate structure.

30. The bonnet according to claim 2, wherein said two parts of said inner member extend in a transverse direction of said vehicle body substantially over a width of said outer member, respectively.

31. The bonnet according to claim 30, wherein at least one part of said inner member each further has a portion extending along an outer edge of said outer member.

32. The bonnet according to claim 2, wherein said two parts of said inner member in a transverse direction of said vehicle body have different lengths.

33. The bonnet according to claim 32, wherein a length of a part at a rear side of said vehicle body of said inner member in said transverse direction of said vehicle body is greater than a length of a part at a front side of said vehicle body of said inner member in said transverse direction of said vehicle body.

34. The bonnet according to claim 2, wherein said two parts of said inner member have different rigidities.

35. The bonnet according to claim 34, wherein a rigidity of a part of said inner member at a rear side of said vehicle body is set smaller than a rigidity of a front-side part of said inner member.

36. The bonnet according to claim 34, wherein a rigidity of a part at a rear side of said vehicle body of said inner member is set greater than a rigidity of a front-side part of said inner member.

37. The bonnet according to claim 34, wherein said difference in rigidity is given by a difference in cross-sectional shape between both parts of said inner member.

38. The bonnet according to claim 34, wherein said difference in rigidity is given by a difference in lamination structure of FRP between FRPs forming both parts of said inner member.

39. The bonnet according to claim 34, wherein said difference in rigidity is given by a difference in kind of reinforcing fiber of FRP between FRPs forming both parts of said inner member.

* * * * *